United States Patent [19]
Kitaori et al.

[11] Patent Number: 5,538,802
[45] Date of Patent: Jul. 23, 1996

[54] MAGNETIC RECORDING MEDIUM AND PROCESS FOR PRODUCING THE SAME

[75] Inventors: Noriyuki Kitaori; Osamu Yoshida; Hirohide Mizunoya, all of Tochigi, Japan

[73] Assignee: KAO Corporation, Chuo-ku, Japan

[21] Appl. No.: 112,142

[22] Filed: Aug. 26, 1993

[30] Foreign Application Priority Data

| Sep. 18, 1992 | [JP] | Japan | 4-249346 |
| Sep. 18, 1992 | [JP] | Japan | 4-249347 |
| Sep. 18, 1992 | [JP] | Japan | 4-249348 |
| Sep. 18, 1992 | [JP] | Japan | 4-249349 |
| Sep. 18, 1992 | [JP] | Japan | 4-249350 |
| Sep. 25, 1992 | [JP] | Japan | 4-256278 |

[51] Int. Cl.$^6$ .................................. G11B 5/66
[52] U.S. Cl. ........................ 428/684 T; 428/694 TS; 428/694 TB; 428/694 TP; 428/694 R; 428/900; 427/128
[58] Field of Search ............ 428/694 T, 694 TS, 428/694 TB, 694 TF, 694 R, 900; 427/128

[56] References Cited

U.S. PATENT DOCUMENTS

| 4,271,232 | 6/1981 | Heiman | 428/332 |
| 4,837,094 | 6/1989 | Kudo | 428/694 |
| 4,855,175 | 8/1989 | Wakai | 428/148 |

FOREIGN PATENT DOCUMENTS

| 60-236113 | 11/1985 | Japan . |
| 63-237219 | 10/1988 | Japan . |
| 2-89213 | 3/1990 | Japan . |

*Primary Examiner*—Leszek Kiliman
*Attorney, Agent, or Firm*—Birch, Stewart, Kolasch & Birch

[57] ABSTRACT

A magnetic recording medium which is uncostly, can dispense with environmental pollution control measures unlike the case of Co or Cr, is highly durable, permits high density recording and comprises a magnetic film selected from the group consisting of:

(1) a Fe—N—O magnetic film comprising 70 to 90 atomic % of Fe, 5 to 15 atomic % of N and 5 to 15 atomic % of O,
(2) a Fe—C—O magnetic film comprising 60 to 85 atomic % of Fe, 5 to 35 atomic % of C and 5 to 15 atomic % of O,
(3) a Fe—P—O magnetic film comprising 70 to 90 atomic % of Fe, 5 to 25 atomic % of P and 5 to 10 atomic % of O,
(4) a Fe—Si—O magnetic film comprising 60 to 90 atomic % of Fe, 5 to 30 atomic % of Si and 5 to 10 atomic % of O,
(5) a Fe—B—O magnetic film comprising 65 to 90 atomic % of Fe, 5 to 30 atomic % of B and 5 to 10 atomic % of O, and
(6) a Fe—Ni—N—O magnetic film comprising 40 to 75 atomic % of Fe, 10 to 30 atomic % of Ni, 10 to 30 atomic % of N and 5 to 10 atomic % of O.

9 Claims, 2 Drawing Sheets

MAGNETIC RECORDING MEDIUM AND PROCESS FOR PRODUCING THE SAME

BACKGROUND OF THE INVENTION

1. Field of the Invention

The present invention relates to a magnetic recording medium and a process for producing the same.

2. Description of the Related Art

The magnetic tape as an example of the magnetic recording medium may be classified into the conventional coating type tape obtained by applying a magnetic coating composition comprising magnetic powder dispersed in a binder to a film as a nonmagnetic substrate, and a thin metal film type tape, i.e., an evaporation type tape, obtained by superimposing a magnetic layer of a thin metal film completely free of a binder on a nonmagnetic substrate according to a vacuum evaporation method in which the magnetic metal is deposited on the substrate in a vacuum, and the like.

In recent years, the magnetic recording is oriented toward high density recording. The thin metal film type tape is regarded as providing a promising means for high density recording because no binder is contained in the magnetic layer to allow the density of the magnetic material to be increase More specifically, a magnetic recording medium, e.g., a thin metal film type tape, having a magnetic layer formed either by wet plating means, such as electroless plating, or by dry plating means, such as vacuum evaporation, sputtering or ion plating, has been proposed. Such a magnetic recording medium has a high packing density of the magnetic material such that it is suitable for high density recording.

The magnetic material for the magnetic layer of the magnetic recording medium of a thin metal film type comprises a magnetic metal, such as a Co—Cr alloy and a Co—Ni alloy. However, Co not only is a rare material which presents a cost problem, but also this material causes environmental pollution. Furthermore, Cr and Ni are not only expensive, but also cause environmental pollution.

By contrast, Fe is free of the above problems, so that it has drawn attention as a magnetic material for use in a magnetic recording medium of the thin metal film type. Thus, although Fe and Ni are thought to be candidates for a non-Co metal magnetic material, Fe is believed to be preferred from the viewpoint of the magnitude of saturation magnetization. However, Fe is more likely to rust than Co, so that the former must be rendered chemically stable.

From this viewpoint, the formation of a magnetic film with $Fe_xN$ has been proposed [see Japanese Patent Publication-A Nos. 236113/1985 and 237219/1988 (published on Oct. 3rd, 1988)]. The magnetic recording medium having a magnetic film composed of $Fe_xN$ is reputed to have desirable magnetic properties and excellent corrosion resistance and high density recording performance. In addition, a Fe-C-N film and other films have been proposed [see, for example, Japanese Patent Publication-A No. 89213/1990 (published on Mar. 29, 1990)]. However, none of the conventional films is satisfactory, and hence an improved film is presently desired in the art.

DISCLOSURE OF THE INVENTION

SUMMARY OF THE INVENTION

An object of the present invention is to provide a magnetic recording medium which is inexpensive, can dispense with environmental pollution control measures unlike the case of Co, Cr or Ni, has a high coercive force and corrosion resistance, is highly durable and permits high density recording.

Another object of the present invention is to provide a process for producing the magnetic recording medium described above.

Thus, the present invention provides a magnetic film selected from the group consisting of:

(1) a Fe—N—O magnetic film comprising 70 to 90 atomic % of Fe, 5 to 15 atomic % of N and 5 to 15 atomic % of O, (2) a Fe—C—O magnetic film comprising 60 to 85 atomic % of Fe, 5 to 35 atomic % of C and 5 to 15 atomic % of O, (3) a Fe—P—O magnetic film comprising 70 to 90 atomic % of Fe, 5 to 25 atomic % of P and 5 to 10 atomic % of O, (4) a Fe—Si—O magnetic film comprising 60 to 90 atomic % of Fe, 5 to 30 atomic % of Si and 5 to 10 atomic % of O, (5) a Fe—B—O magnetic film comprising 65 to 90 atomic % of Fe, 5 to 30 atomic % of B and 5 to 10 atomic % of O, and (6) a Fe—Ni—N—O magnetic film comprising 40 to 75 atomic % of Fe, 10 to 30 atomic % of Ni, 10 to 30 atomic % of N and 5 to 10 atomic % of O, and a magnetic recording medium comprising the above-described magnetic film.

The present invention includes the following embodiments:

(1') A magnetic recording medium characterized in that a Fe—N—O ferromagnetic thin film comprising Fe having a purity of at least 99.95%, N and O in respective proportions of 70 to 90 atomic %, 5 to 15 atomic % and 5 to 15 atomic % is formed on a nonmagnetic substrate.

(2') A magnetic recording medium characterized by being composed of a Fe—C—O magnetic film having component proportions comprising 60 atomic % $\leq$ Fe $\leq$ 85 atomic %, 5 atomic % $\leq$ C $\leq$ 35 atomic % and 5 atomic % $\leq$ O $\leq$ 15 atomic %.

(3') A magnetic recording medium characterized by being composed of a Fe—P—O magnetic film having component proportions comprising 70 atomic % $\leq$ Fe $\leq$ 90 atomic %, 5 atomic % $\leq$ P $\leq$ 25 atomic % and 5 atomic % $\leq$ O $\leq$ 10 atomic %.

(4') A magnetic recording medium characterized by being composed of a Fe—Si—O magnetic film having component proportions comprising 60 atomic % $\leq$ Fe $\leq$ 90 atomic %, 5 atomic % $\leq$ Si $\leq$ 30 atomic % and 5 atomic % $\leq$ O $\leq$ 10 atomic %.

(5') A magnetic recording medium characterized by being composed of a Fe—B—O magnetic film having component proportions comprising 65 atomic % $\leq$ Fe $\leq$ 90 atomic %, 5 atomic % $\leq$ B $\leq$ 30 atomic % and 5 atomic % $\leq$ O $\leq$ 10 atomic %.

(6') A magnetic recording medium characterized by being composed of a Fe—Ni—N—O magnetic film having component proportions comprising 40 atomic % $\leq$ Fe $\leq$ 75 atomic %, 10 atomic % $\leq$ Ni $\leq$ 30 atomic %, 10 atomic % $\leq$ N $\leq$ 30 atomic % and 5 atomic % $\leq$ O $\leq$ 10 atomic %.

The magnetic film is preferably formed with the use of Fe having a purity of at least 99.95%.

In the above embodiment (6), the magnetic film is preferably formed with the use of Fe having a purity of at least 99.95% and/or Ni having a purity of at least 99.95%.

The magnetic film is generally formed on a nonmagnetic substrate.

The magnetic recording medium according to the present invention advantageously comprises a nonmagnetic substrate, an undercoat layer formed on a surface of the nonmagnetic substrate, the magnetic film formed on the undercoat layer and a back coat layer provided on the other surface of the nonmagnetic substrate.

The present invention also provides a magnetic recording medium which exhibits an excellent corrosion resistance and a high hardness and has a coercive force Hc of at least 1100 Oe and a saturation magnetic flux density Be of at least 4000 G which comprises a magnetic film containing iron as a major constituent, oxygen as a minor constituent, and at least one member selected from the group consisting of nitrogen, carbon, phosphorus, silicon, boron and nickel.

The present invention provides a process for producing a magnetic recording medium which comprises (A) evaporating Fe having a purity of at least 99.95% and depositing the evaporated Fe onto the surface of a nonmagnetic substrate in an oblique direction thereto, (B) causing nitrogen ions, carbon ions, phosphorus ions, silicon ions or boron ions to collide against Fe simultaneously and/or after the deposition of the Fe, and (C) causing oxygen ions to collide against Fe simultaneously and/or after the deposition of the Fe.

Namely, the process according to the present invention related to a process for producing a magnetic recording medium which comprises a vacuum evaporation step (A) wherein Fe having a purity of at east 99.95% is used as an evaporation vapor source material and is deposited on the surface of a nonmagnetic substrate in an oblique direction thereto, a collision step (B) wherein nitrogen ions, carbon ions, phosphorus ions, silicon ions or boron ions are collided against Fe simultaneously and/or after the deposition of Fe, and another collision step (C) wherein oxygen ions are collided against Fe simultaneously and/or after the deposition of Fe.

The present invention includes the following embodiments:

(11) A process for producing a magnetic recording medium characterized by depositing Fe having a purity of at least 99.95% on the surface of the nonmagnetic substrate in an oblique direction thereto in a vacuum atmosphere and irradiating the deposition surface with nitrogen and oxygen ions generated from a mixture of $N_2$ and $O_2$ gases by an ion gun to thereby form a Fe—N—O ferromagnetic thin film.

(12) A process for producing a magnetic recording medium by forming a magnetic film on a nonmagnetic substrate according to the ion-assisted, oblique vacuum evaporation method, characterized by comprising a vacuum evaporation step wherein Fe having a purity of at least 99.95% is used as an evaporation vapor source material, a collision step wherein carbon ions are collided against a deposited Fe film, and another collision step wherein oxygen ions are collided against a deposited Fe film.

(13) A process for producing a magnetic recording medium by forming a magnetic film on a nonmagnetic substrate according to the ion-assisted, oblique vacuum evaporation method, characterized by comprising a vacuum evaporation step wherein Fe having a purity of at least 99.95% is used as an evaporation vapor source material, a collision step wherein phosphorus ions are collided against a deposited Fe film, and another collision step wherein oxygen ions are collided against a deposited Fe film.

(14) A process for producing a magnetic recording medium by forming a magnetic film on a nonmagnetic substrate according to the ion-assisted, oblique vacuum evaporation method, characterized by comprising a vacuum evaporation step wherein Fe having a purity of at least 99.95% is used as an evaporation vapor source material, a collision step wherein silicon ions are collided against a deposited Fe film, and another collision step wherein oxygen ions are collided against a deposited Fe film.

(15) A process for producing a magnetic recording medium by forming a magnetic film on a nonmagnetic substrate according to the ion-assisted, oblique vacuum evaporation method, characterized by comprising a vacuum evaporation step wherein Fe having a purity of at least 99.95% is used as an evaporation vapor source material, a collision step wherein boron ions are collided against a deposited Fe film, and another collision step wherein oxygen ions are collided against a deposited Fe film.

In the process described above, the collision steps (B) and (C) are preferably conducted simultaneously.

In the above embodiment (12), the carbon ions and the oxygen ions to be collided are advantageously generated from a mixture of $CH_4$ and $O_2$ gases by an ion gun.

The present invention further provides a process for producing a magnetic recording medium which comprises (D) evaporating Fe and Ni and depositing the evaporated Fe and Ni onto the surface of a nonmagnetic substrate in an oblique direction thereto, (E) causing nitrogen ions to collide against Fe and Ni and/or an alloy of Fe and Ni simultaneously and/or after the deposition of Fe and Ni and/or the alloy of Fe and Ni, and (F) causing oxygen ions to collide against Fe and Ni and/or an alloy of Fe and Ni simultaneously and/or after the deposition of the Fe and Ni and/or the alloy of Fe and Ni.

Namely, the process according to the present invention relates to a process for producing a magnetic recording medium which comprises a vacuum evaporation step (D) wherein Fe and Ni are used as evaporation vapor source materials and are deposited on the surface of a nonmagnetic substrate in an oblique direction thereto, a collision step (E) wherein nitrogen ions are collided against Fe and Ni and/or an alloy of Fe and Ni, simultaneously and/or after the deposition of Fe and Ni and/or the alloy of Fe and Ni, and another collision step (F) wherein oxygen ions are collided against Fe and Ni and/or an alloy of Fe and Ni, simultaneously and/or after the deposition of Fe and Ni and/or the alloy of Fe and Ni.

The present invention further includes the following embodiment:

(16) A process for producing a magnetic recording medium by forming a magnetic film on a nonmagnetic substrate according to the ion-assisted, oblique vacuum evaporation method, characterized by comprising a vacuum evaporation step wherein Fe and Ni are used as evaporation vapor source materials, a collision step wherein nitrogen ions are collided against a deposited Fe—Ni film, and another collision step wherein oxygen ions are collided against a deposited Fe-Ni film.

In the process described above, Fe having a purity of at least 99.95% and/or Ni having a purity of at least 99.95% is(are) preferably used.

In the process described above, an alloy consisting essentially of Fe and Ni is used as the evaporation vapor source material, or Fe and Ni are separately used as the evaporation vapor source materials in the vacuum evaporation step (D).

In the process described above, the collision steps (E) and (F) are advantageously conducted simultaneously.

The nitrogen ions and the oxygen ions to be collided are advantageously generated from a mixture of $N_2$ and $O_2$ gases by an ion gun.

Furthermore, the present invention provides a process for producing a magnetic recording medium which comprises (A) evaporating Fe having a purity of at least 99.95% and depositing the evaporated Fe onto the surface of a nonmagnetic substrate in an oblique direction thereto, (B) causing nitrogen ions, carbon ions, phosphorus ions, silicon ions or boron ions to collide against Fe simultaneously and/or after the deposition of the Fe, and (G) causing an oxygen gas to collide against Fe simultaneously and/or after the deposition of the Fe.

Namely, the process according to the present invention relates to a process for producing a magnetic recording medium which comprises a vacuum evaporation step (A) wherein Fe having a purity of at least 99.95% is used as an evaporation vapor source material and is deposited on the surface of a nonmagnetic substrate in an oblique direction thereto, a collision step (B) wherein nitrogen ions, carbon ions, phosphorus ions, silicon ions or boron ions are collided against Fe simultaneously and/or after the deposition of Fe, and another collision step (G) wherein an oxygen gas is collided against Fe simultaneously and/or after the deposition of Fe.

Thus, the present invention includes the following embodiments:

(21) A process for producing a magnetic recording medium by forming a magnetic film on a nonmagnetic substrate according to the ion-assisted, oblique vacuum evaporation method, characterized by comprising a vacuum evaporation step wherein Fe having a purity of at least 99.95% is used as an evaporation vapor source material, a collision step wherein nitrogen ions are collided against a deposited Fe film, and another collision step wherein an oxygen gas is collided against a deposited Fe film.

(22) A process for producing a magnetic recording medium by forming a magnetic film on a nonmagnetic substrate according to the ion-assisted, oblique vacuum evaporation method, characterized by comprising a vacuum evaporation step wherein Fe having a purity of at least 99.95% is used as an evaporation vapor source material, a collision step wherein carbon ions are collided against a deposited Fe film, and another collision step wherein an oxygen gas is collided against a deposited Fe film.

(23) A process for producing a magnetic recording medium by forming a magnetic film on a nonmagnetic substrate according to the ion-assisted, oblique vacuum evaporation method, characterized by comprising a vacuum evaporation step wherein Fe having a purity of at least 99.95% is used as an evaporation vapor source material, a collision step wherein phosphorus ions are collided against a deposited Fe film, and another collision step wherein an oxygen gas is collided against a deposited Fe film.

(24) A process for producing a magnetic recording medium by forming a magnetic film on a nonmagnetic substrate according to the ion-assisted, oblique vacuum evaporation method, characterized by comprising a vacuum evaporation step wherein Fe having a purity of at least 99.95% is used as an evaporation vapor source material, a collision step wherein silicon ions are collided against a deposited Fe film, and another collision step wherein an oxygen gas is collided against a deposited Fe film.

(25) A process for producing a magnetic recording medium by forming a magnetic film on a nonmagnetic substrate according to the ion-assisted, oblique vacuum evaporation method, characterized by comprising a vacuum evaporation step wherein Fe having a purity of at least 99.95% is used as an evaporation vapor source material, a collision step wherein boron ions are collided against a deposited Fe film, and another collision step wherein an oxygen gas is collided against a deposited Fe film.

In the process described above, the collision steps (B) and (G) are advantageously conducted simultaneously.

In addition, the present invention provides a process for producing a magnetic recording medium which comprises (D) evaporating Fe and Ni and depositing the evaporated Fe and Ni onto the surface of a nonmagnetic substrate in an oblique direction thereto, (E) causing nitrogen ions to collide against Fe and Ni and/or an alloy of Fe and Ni simultaneously and/or after the deposition of the Fe and Ni and/or the alloy of Fe and Ni, and (H) causing an oxygen gas to collide against Fe and Ni and/or an alloy of Fe and Ni simultaneously and/or after the deposition of the Fe and Ni and/or the alloy of Fe and Ni.

In other words, the present invention relates to a process for producing a magnetic recording medium which comprises a vacuum evaporation step (D) wherein Fe and Ni are used as evaporation vapor source materials and are deposited on the surface of a nonmagnetic substrate in an oblique direction thereto, a collision step (E) wherein nitrogen ions are collided against Fe and Ni and/or an alloy of Fe and Ni simultaneously and/or after the deposition of Fe and Ni and/or the alloy of Fe and Ni, and another collision step (H) wherein an oxygen gas is collided against Fe and Ni and/or an alloy of Fe and Ni simultaneously and/or after the deposition of Fe and Ni and/or the alloy of Fe and Ni.

The present invention includes the following embodiment:

(26) A process for producing a magnetic recording medium by forming a magnetic film on a nonmagnetic substrate according to the ion-assisted, oblique vacuum evaporation method, characterized by comprising a vacuum evaporation step wherein Fe and Ni is used as evaporation vapor source materials, a collision step wherein nitrogen ions are collided against a deposited Fe—Ni film, and a further collision step wherein an oxygen gas is collided against a deposited Fe—Ni film.

In the process described above, Fe having a purity of at least 99.95% and/or Ni having a purity of at least 99.95% is(are) preferably used.

In the process described above, an alloy consisting essentially of Fe and Ni is used as the evaporation vapor source material, or Fe and Ni are separately used as the evaporation vapor source materials in the vacuum evaporation step (D).

In the process; described above, the collision steps (E) and (H) are advantageously conducted simultaneously.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

Further scope and the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Hereinbelow, the present invention will be described in greater detail.

Figure 1:
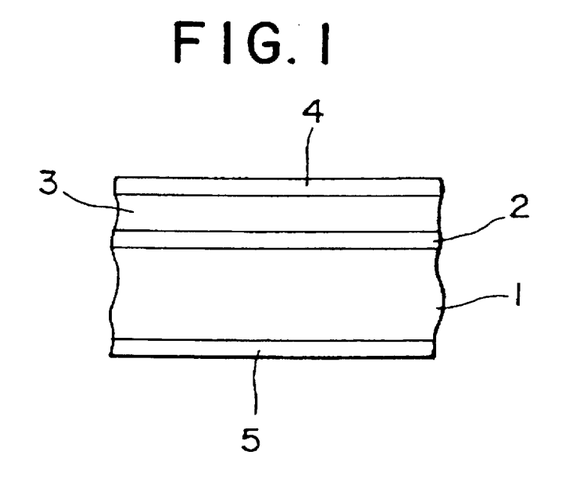
FIG. 1 is a schematic sectional view of a magnetic recording medium.

FIG. 1 is a schematic sectional view of an embodiment of the magnetic recording medium according to the present invention.

In the drawing, numeral 1 designates a nonmagnetic substrate. As the substrate 1, use is made of a polymer material such as a polyester including for example polyethylene terephthalate, a polyamide, a polyimide, an aramid, a polysulfone, a polycarbonate, an olefinic resin including for example polypropylene, a cellulosic resin and a vinyl chloride resin; an inorganic material such as glass or ceramics; and a metallic material such as an aluminum alloy.

An undercoat layer 2 is disposed on the substrate 1 to improve the adhesion of a magnetic layer 3. More specifically, the surface of the substrate 1 is appropriately toughened so as to improve the adhesion of a magnetic layer 3 to be formed by electroless plating. Further, in order to improve the traveling performance by rendering suitable the surface roughness of the magnetic recording medium, the undercoat layer 2 is provided which is composed of, for example, a film of 0.01 to 0.5 μm in thickness containing granules of $SiO_2$, etc.

The magnetic layer 3 of the thin metal film type is provided on the undercoat layer 2 in an ion-assisted, oblique vacuum evaporation apparatus. For example, Fe having a purity of at least 99.95% is evaporated in a vacuum atmosphere of about $10^{-4}$ to $10^{-6}$ Torr by resistance heating, high frequency heating or electron beam heating, and deposited (vapor deposited) on the undercoat layer 2 of the substrate 1 so as to form a magnetic layer 3 of 0.04 to 1 μm in thickness. When the Fe—Ni—N—O magnetic film as the magnetic layer 3 is formed, use may be made of a Fe—Ni alloy as the evaporation vapor source material, or alternatively, use may be made of a binary vacuum evaporation method wherein Fe and Ni are disposed at respective evaporation sources.

In the present invention, in the formation of the magnetic layer 3, the deposited Fe film or the deposited Fe—Ni ($Fe_3Ni$) film is irradiated with nitrogen ions, carbon ions, phosphorus ions, silicon ions or boron ions, and oxygen ions (or an oxygen gas), so that the magnetic layer 3 has a Fe—N—O composition or a Fe—Ni—N—O composition, a Fe—C—O composition, a Fe—P—O composition, a Fe—Si—O composition, or a Fe—B—O composition, respectively.

In the formation of the magnetic layer 3 according to the present invention, the proportions of the components composing the magnetic layer 3 must fall within desired ranges. Therefore, the conditions for vacuum evaporation are controlled to give a magnetic layer 3 having a desired composition.

Figure 2:
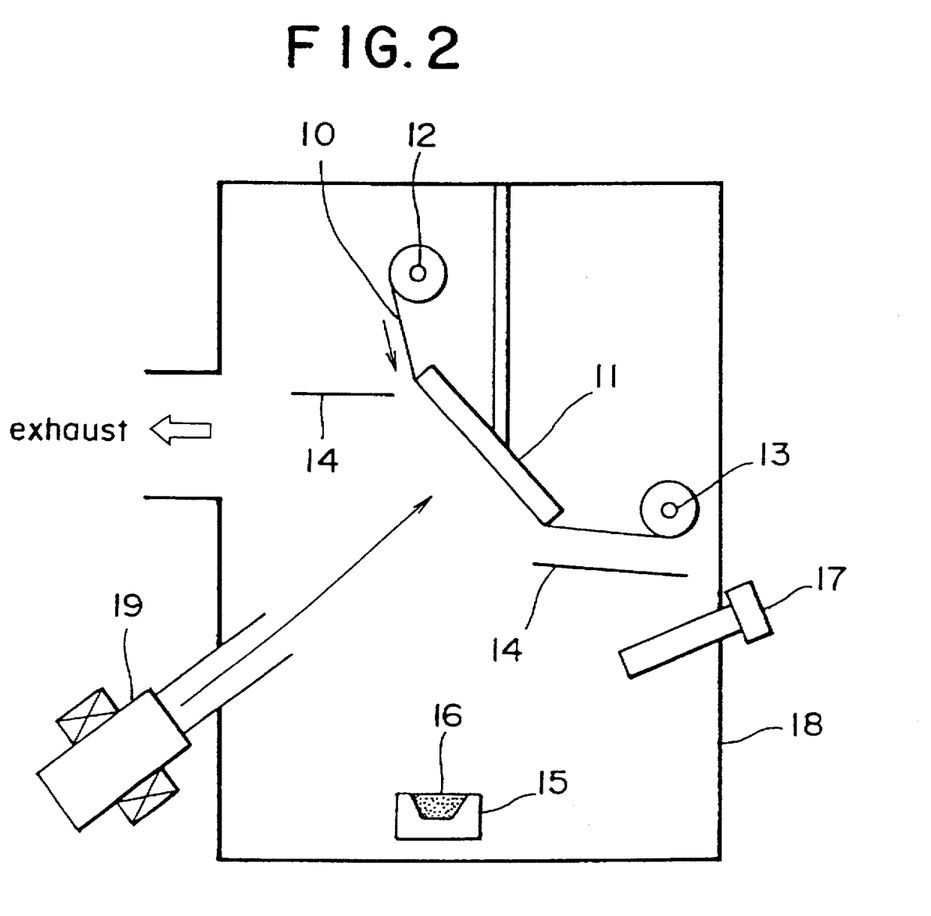
FIG. 2 is a schematic view of an apparatus for producing a magnetic recording medium.

In the present invention, the magnetic layer 3 must have (1) a Fe—N—O composition comprising 70 to 90 atomic % of Fe, 5 to 15 atomic % of N and 5 to 15 atomic % of O, (2) a Fe—C—O composition comprising 60 to 85 atomic % of Fe, 5 to 35 atomic % of C and 5 to 15 atomic % of O, (3) a Fe—P—O composition comprising 70 to 90 atomic % of Fe, 5 to 25 atomic % of P and 5 to 10 atomic % of O, (4) a Fe—Si—O composition comprising 60 to 90 atomic % of Fe, 5 to 30 atomic % of Si and 5 to 10 atomic % of O, (5) a Fe—B—O composition comprising 65 to 90 atomic % of Fe, 5 to 30 atomic % of B and 5 to 10 atomic % of O, or (6) a Fe—Ni—N—O composition comprising 40 to 75 atomic % of Fe, 10 to 30 atomic: % of Ni, 10 to 30 atomic % of N and 5 to 10 atomic % of O, The ion-assisted, oblique vacuum evaporation apparatus has a construction as illustrated in FIG. 2. In FIG. 2, numeral 11 designates a guide member, numeral 12 a roll for feeding a PET film 10, numeral 13 a roll for taking up the PET film 10, numeral 14 a shielding plate, numeral 15 a crucible, numeral 16 Fe having a purity of at least 99.95% or a Fe—Ni ($Fe_3Ni$) alloy, numeral 17 an electron gun, numeral 18 a vacuum chamber, and numeral 19 an ion gun.

When a N-containing gas such as $N_2$ gas or $NH_3$ gas and an oxygen gas are fed to the ion gun 19, nitrogen ions and oxygen ions are emitted and collided against the Fe film deposited on the PET film 10 to thereby convert Fe into a Fe—N—O composition, or alternatively nitrogen ions and oxygen ions are emitted and collided against the Fe—Ni ($Fe_3Ni$) film deposited on the PET film 10 to thereby convert Fe—Ni into a Fe—Ni—N—O composition. That is, the $Fe_3Ni$ film is oxidized to become stable in the latter case.

When a hydrocarbon gas selected from among methane, ethane, propane, etc., ethylene etc., and acetylene etc., and an oxygen gas are fed to the ion gun 19, carbon ions and oxygen ions are emitted and collide against the Fe film deposited on the PET film 10 to thereby convert Fe into a Fe—C—O composition.

When a P-containing gas such as $PH_3$ is fed to the ion gun 19, and when an oxygen gas is fed to a second ion gun not shown, phosphorus ions and oxygen ions are respectively emitted and collided against the Fe film deposited on the PELT film 10 to thereby convert Fe into a Fe—P—O composition.

When a Si-containing gas such as $SiH_4$, $Si_2H_6$, $Si_3H_8$ or $Si_4H_{10}$ is fed to tile ion gun 19 and when an oxygen gas is fed to a second ion gun not shown, silicon ions and oxygen ions are respectively emitted and collide against the Fe film deposited on the PET film 10 to thereby convert the Fe into a Fe—Si—O composition.

When a B-containing gas such as $B_2H_6$, $B_4H_{10}$, $B_5H_9$ or $B_5H_{11}$ is fed to the ion gun 19 and when an oxygen gas is fed to a second ion gun not shown, boron ions and oxygen ions are respectively emitted and collide against the Fe film deposited on the PET film 10 to thereby convert the Fe into a Fe—B—O composition.

Instead of the irradiation of the deposited Fe film with oxygen ions, an oxygen gas can be fed to the deposited Fe film to form a Fe—N—O magnetic film, a Fe—C—O magnetic film, a Fe—P—O magnetic film, a Fe—Si—O magnetic film or a Fe—B—O magnetic film. Meanwhile, instead of the irradiation of the deposited Fe—Ni film with oxygen ions, an oxygen gas can be fed to the deposited Fe—Ni film to form a Fe—Ni—N—O magnetic film. In these cases, an oxygen gas feed pipe having a nozzle is disposed in the vicinity of the deposited Fe film or the deposited Fe—Ni film. In these cases, the second ion gun is unnecessary.

When the magnetic film, that is, the magnetic layer 3, is composed of a metal film having (1) a Fe—N—O composition comprising 70 to 90 atomic % of Fe, 5 to 15 atomic % of N and 5 to 15 atomic % of O (2) a Fe—C—O composition comprising 60 to 85 atomic % of Fe, 5 to 35 atomic % of C and 5 to 15 atomic % of O, (3) a Fe—P—O composition comprising 70 to 90 atomic % of Fe, 5 to 25 atomic % of P and 5 to 10 atomic % of O, (4) a Fe—Si—O composition comprising 60 to 90 atomic % of Fe 5 to 30 atomic % of Si and 5 to 10 atomic % of O (5) a Fe—B—O composition comprising 65 to 90 atomic % of Fe, 5 to 30 atomic % of B and 5 to 10 atomic % of O, or (6) a Fe—Ni—N—O composition comprising 40 to 75 atomic % of Fe 10 to 30 atomic % of Ni 10 to 30 atomic % of N and 5 to 10 atomic % of O the resultant magnetic recording medium exhibits a coercive force Hc as high as 1100 Oe or above and a saturation magnetic flux density Bs as high as 4000 G or above, exhibits excellent corrosion resistance, and possesses a high hardness, so that it can dispense with a protective film for the magnetic layer 3. Further, the resultant magnetic recording medium permits high density recording as a substitute for the magnetic recording medium of a magnetic metal such as a Co—Cr or Co—Ni alloy.

To obtain a metal film having the above-described composition (1), (2), (3), (4) or (5), Fe having a purity of at least 99.95% is used as the evaporation source material and the nitrogen ions, carbon ions, phosphorus ions, silicon ions or boron ions, and the oxygen ions (or oxygen gas) are collided against the deposited Fe film. To obtain the metal film having the above-described composition (6), Fe having a purity of at least 99.95% and Ni having a purity of at least 99.95% are used as the evaporation source materials separately or in the form of an alloy and the nitrogen ions and the oxygen ions (or oxygen gas) are collided against the deposited Fe—Ni film.

In this connection, however, it is important that the nitrogen ions, carbon ions, phosphorus ions, silicon ions or boron ions, and the oxygen ions (active oxygen) generated by ionization be collided against the deposited Fe or Fe—Ni simultaneously with the deposition of evaporated Fe or Fe—Ni on the film to effect reactions such as nitriding, carbonization and oxidation.

It this step, when the guide member 11 as shown in FIG. 2 is heated to a temperature which is as high as possible but lower than the temperature at which the film 10 causes thermal deformation, the reactivity, that is, the adhesion of the evaporated material(s) with the film 10, can be enhanced and favorable results can be obtained. In general, when a polymer material such as an aramid and a polyethylene naphthalate (PEN) is used as the film 10, heating of the guide member 11 can be conducted. However, when a polymer material such as a polyethylene terephthalate is used as the film 10, heating of the guide member 11 is not conducted or heating thereof to a temperature of 70° C. or below is conducted.

Numeral 4 designates a lubricant layer provided on the magnetic layer 3. The lubricant layer 4, which has a thickness of about 5 to 50 Å, preferably about 10 to 30 Å, is provided by applying a coating composition containing a lubricant utilizing known means.

Numeral 5 designates a back coat layer provided on the other side of the substrate 1, which has carbon black or the like filled therein.

Hereinbelow, another embodiment of the present invention will be described. In this embodiment, the description is made of the case where a Fe—N—O magnetic film is formed.

Figure 3:
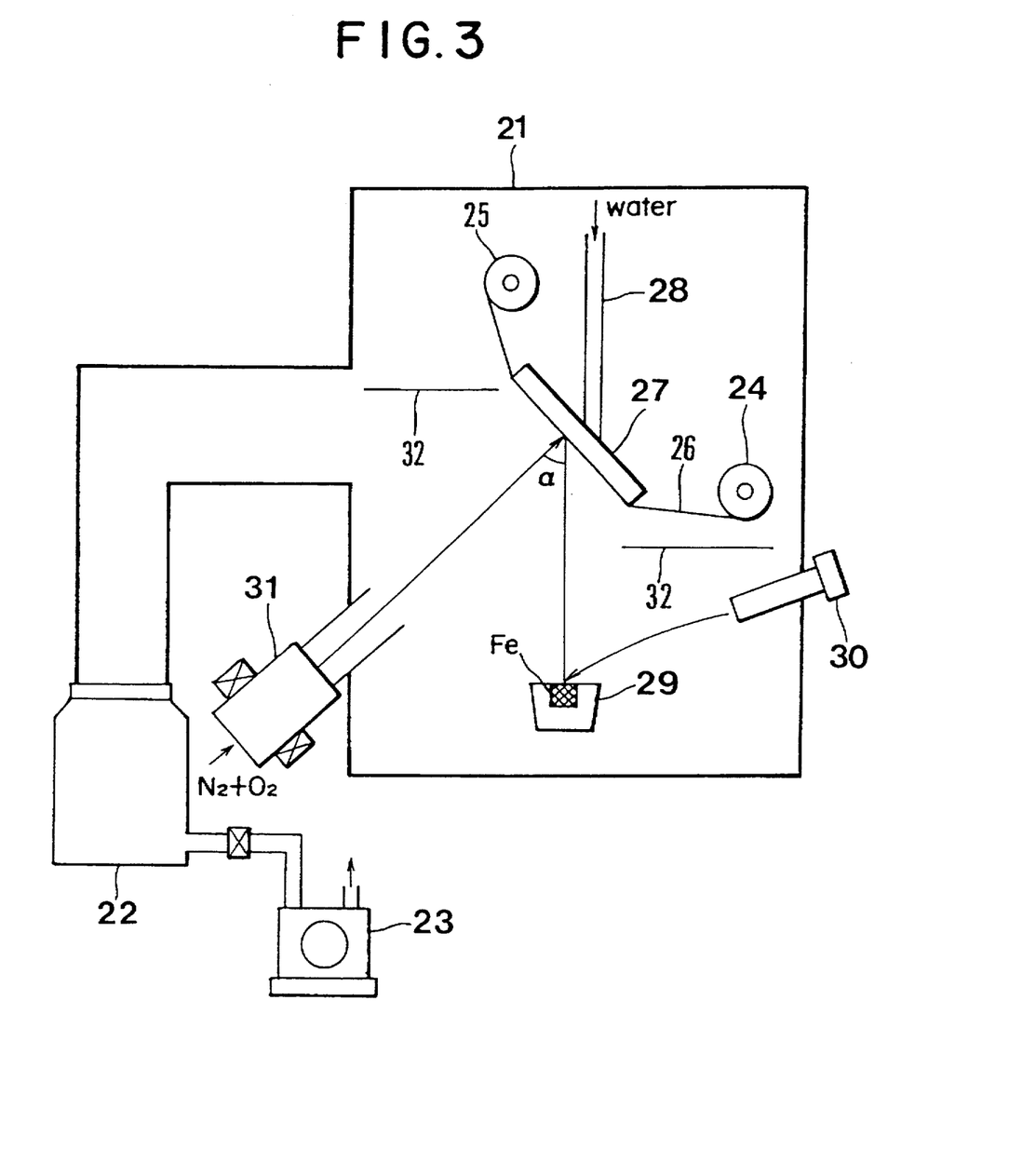
FIG. 3 is a structural view of one example of the vacuum evaporation apparatus for use in producing the magnetic recording medium according to the present invention.

FIG. 3 is a schematic structural view of one example of the apparatus for oblique vacuum evaporation which is suitable for use in the production of the magnetic recording medium according to the present invention.

In FIG. 3, the: inside of the vacuum chamber 21 is evacuated with a turbopump 22 and a rotary pump 23. In the vacuum chamber 21, a feed roll 24 and a takeup roll 25 are provided. While being fed from the feed roll 24 and taken up by the takeup roll 25, a polymer film 26, as a nonmagnetic substrate, produced from a polyethylene terephthalate (PET) a polyimide an aramid or the like travels along, for example, a planar cooling plate 27 in which cooling water flows. In this cooling plate 27, cooling water is fed from a cooling water feed pipe 28 and discharged through a discharge pipe not shown. The cooling water is fed from and recycled to an external cooling water tank.

Under the cooling plate 27, as shown in FIG. 8, a crucible 29 made of MgO is placed. Fe having a purity of, for example, 99.95% is put in the crucible 29, and the surface of the Fe in the crucible 29 is irradiated with an electron beam emitted from an electron beam gun 30 placed in an oblique, upper position to the Fe surface. By this irradiation, the Fe is vaporized through heating. In the vacuum evaporation of the Fe, as shown in FIG. 8, the cooling plate 27 is so inclined that the angle $\alpha$ of the incidence of the Fe vapor stream from the crucible 29 to the film 26 is, for example, 60° to the normal direction of the film 26 in this Embodiment. By using this oblique vacuum evaporation method, the magnetic layer has a magnetic anisotropy which improves the magnetic properties thereof.

Further, an ion gun 31 is provided in a direction perpendicular to the deposition surface of the film 26. A mixture of $N_2$ and $O_2$ gases is fed to the ion gun 31 to generate nitrogen ions and oxygen ions. While depositing Fe on the surface of the film 26, the deposition surface is irradiated with the nitrogen ions and oxygen ions. In the figure, numeral 32 designates a shielding plate for limiting the region of the film 26 where the deposition is performed.

A magnetic recording medium is obtained, which is economically favorable because of the use of inexpensive Fe, can dispense with environmental pollution control measures unlike the case of Co or Cr, is highly durable, and permits high density recording.

Examples

The present invention will now be described in greater detail with reference to the following specific Examples which should not be considered as limiting the scope of the present invention.

Example A

Now, examples of the magnetic recording medium produced using the above vacuum evaporation apparatus shown in FIG. 3 will be described.

In the vacuum evaporation apparatus of FIG. 3, Fe put in the MgO crucible 29 having an inner capacity of 60 cc is heated by the electron beam gun 30 to vaporize and the resultant vapor stream is deposited on the surface of the PET film 26 having a thickness of 10 μm and a width of 10 cm at an angle $\alpha$ of incidence of 60°. Simultaneously, the deposition surface is irradiated with nitrogen ions and oxygen ions emitted by the ion gun 31, thereby forming a magnetic layer having a thickness of 1000 Å. The output of the electron beam gun 30 is 30 kW, and an ECR (electron cyclotron resonance) ion gun is used as the ion gun 31. The output of the ion gun 31 is 400 W, and the $N_2$ gas and the $O_2$ gas are fed at respective rates of 3 cc/min and 2 cc/min to obtain the gas mixture. The film 26 is fed at a traveling rate of 2 m/min.

Under the above production conditions, Fe purities and Fe—N—C, component proportions are varied to form magnetic layers of Examples A-1 to A-5 and Comparative Examples A-1 to A-5 as specified in Table 1. Among the resultant magnetic recording media, the magnetic characteristics and corrosion resistance are compared. Regarding the magnetic characteristics, the coercive force Hc (Oe) and the saturation magnetic flux density Bs (G) are measured with the use of VSM (a product of RIKEN DENSHI) in 10 k Oof applied magnetic field. The corrosion resistance is evaluated on the basis of a percentage decrease ΔBs in saturation magnetic flux density Bs as determined by the measurements before and after immersion in a 5% aqueous NaCl solution at 20° C. for one week.

The target values of the coercive force Hc (Oe), saturation magnetic flux density Bs (G) and percentage decrease ΔBs (corrosion resistance) are respectively set at 1800 Oe or above 4000 G or above and 9%, or less.

TABLE 1

Comparison of magnetic characteristics between Examples and Comparative Examples

| Characteristics | Fe purity (%) | Compn. (at %) | | | Hc (Oe) | ΔBs (%) | Bs (G) |
|---|---|---|---|---|---|---|---|
| | | Fe | N | O | | | |
| Ex. A-1 | 99.95 | 90 | 5 | 5 | 1800 | 3 | 6200 |
| Ex. A-2 | 99.95 | 70 | 15 | 15 | 2100 | 1 | 4000 |
| Ex. A-3 | 99.95 | 80 | 10 | 10 | 2000 | 2 | 4200 |
| Ex. A-4 | 99.95 | 80 | 15 | 5 | 1900 | 4 | 4400 |
| Ex. A-5 | 99.95 | 80 | 5 | 15 | 1860 | 2 | 4200 |
| Comp. Ex. A-1 | 99.0 | 80 | 5 | 5 | 1790 | 12 | 6100 |
| Comp. Ex. A-2 | 99.9 | 90 | 5 | 5 | 1790 | 10 | 6100 |
| Comp. Ex. A-3 | 99.95 | 85 | 0 | 15 | 1500 | 10 | 4100 |
| Comp. Ex. A-4 | 99.95 | 85 | 15 | 0 | 1200 | 14 | 4500 |
| Comp. Ex. A-5 | 99.95 | 55 | 15 | 30 | 870 | 5 | 2100 |

As apparent from Table 1 the magnetic layers of the Examples each comprising Fe having a purity of at least 99.95%, N and O in respective proportions of 70 to 90 atomic % 5 to 15 atomic % and 5 to 15 atomic % exhibit fully satisfactory values in coercive force, saturation magnetic flux density and corrosion resistance. Thus, in each of the Examples, a magnetic layer can be obtained, which is fully satisfactory from the viewpoint of attaining high recording density in a magnetic recording medium.

On the other hand, when the purity of Fe is lower than 99.95%, it is shown that ΔBs is much larger than 9% to thereby lower the corrosion resistance. When O is in excess, the corrosion resistance is satisfactory but the saturation magnetic flux density Bs is too low. On the other hand, when O is less, both of the coercive force Hc and the corrosion resistance are poor. Further, when N is less, both the coercive force Hc and the corrosion resistance are poor.

Example B (Examples B-1 to B-3)

A PET film having a thickness of 10 μm is fitted in an ion-assisted, oblique vacuum evaporation apparatus as illustrated in FIG. 2 and the PET film 10 is fed at a traveling speed of 2 m/min.

Then Fe 16 having a purity of 99.95% or above is put in a crucible 15 made of magnesium oxide. An electron gun 17 of, for example, 30 kW in output is actuated to evaporate the Fe, so that Fe granules are deposited on the PET film 10. Simultaneously, a mixed gas comprising gaseous $CH_4$ as a carbon ion source and gaseous oxygen as an oxygen ion source is fed to an ion gun 19 of 400 W in output (gaseous $CH_4$ being fed at a rate of 3 $cm^3$/min while gaseous oxygen being fed at a rate of 1 $cm^3$/min) so that the PET film 10 is irradiated therewith.

By the ion-assisted, oblique vacuum evaporation method, a magnetic film of 1000 Å in thickness is formed to thereby obtain a magnetic tape.

The above procedure is repeated by varying the feeding rates of gaseous $CH_4$ and gaseous oxygen to obtain magnetic tapes each having a magnetic film of 1000 Å in thickness. (Comparative Examples B-1 to B-3)

The same procedure as that described in the above Examples B-1 to B-3 is repeated except that use is made of Fe having a purity of 99.9%.

For each of the magnetic recording media obtained in the above Examples and Comparative Examples, the magnetic characteristics and corrosion resistance are evaluated in the same manner to those of Example Å. The evaluation results are shown in Table 2 below.

TABLE 2

| | Compn. (atomic %) | | | Coercive force (Oe) | Saturation magnetic flux density (G) | ΔBs (%) |
|---|---|---|---|---|---|---|
| | Fe | C | O | | | |
| Ex. B-1 | 80 | 10 | 10 | 1150 | 4500 | 4 |
| Ex. B-2 | 60 | 35 | 5 | 1100 | 4000 | 3 |
| Ex. B-3 | 80 | 5 | 15 | 1200 | 4300 | 3 |
| Comp. Ex. B-1 | 55 | 35 | 15 | 770 | 2900 | 12 |
| Comp. Ex. B-2 | 55 | 40 | 5 | 740 | 3600 | 11 |
| Comp. Ex. B-3 | 60 | 20 | 20 | 800 | 3500 | 11 |

Example C (Examples C-1 to C-5 and Comparative Examples C-1 to C-4)

A magnetic tape is obtained by repeating the same procedure as that of Example B except that gaseous $PH_4$ as a phosphorus ion source is fed to an ion gun 19 of 400 W in output (gaseous $PH_4$ being fed at a rate of 2 $cm^3$/min) and gaseous oxygen as an oxygen ion source is fed to another ion gun of 400 W in output (gaseous oxygen being fed at a rate of 3 $cm^3$/min) and they are used for irradiation.

The evaluation results are shown in Table 3 below.

TABLE 3

| | Compn. (atomic %) | | | Coercive force (Oe) | Saturation magnetic flux density (G) | ΔBs (%) |
|---|---|---|---|---|---|---|
| | Fe | P | O | | | |
| Ex. C-1 | 80 | 10 | 10 | 1200 | 5200 | 3 |
| Ex. C-2 | 75 | 15 | 10 | 1100 | 4500 | 2 |
| Ex. C-3 | 90 | 5 | 5 | 1150 | 6500 | 7 |
| Ex. C-4 | 70 | 25 | 5 | 1100 | 4800 | 3 |
| Ex. C-5 | 70 | 20 | 10 | 1100 | 4600 | 2 |
| Comp. Ex. C-1 | 90 | 10 | 0 | 790 | 5600 | 14 |
| Comp. Ex. C-2 | 90 | 0 | 10 | 1000 | 5400 | 14 |
| Comp. Ex. C-3 | 65 | 25 | 10 | 900 | 3600 | 12 |
| Comp. Ex. C-4 | 95 | 0 | 5 | 920 | 7200 | 19 |

Example D (Examples D-1 to D-5 and Comparative Examples D-1 to D-5)

A magnetic tape is obtained by repeating the same procedure as that of Example C except that gaseous $SiH_4$ as a silicon ion source is substituted for gaseous $PH_4$ as a phosphorus ion source.

The evaluation results are shown in Table 4 below.

TABLE 4

| | Compn. (atomic %) | | | Coercive force | Saturation magnetic flux density | $\Delta$Bs |
|---|---|---|---|---|---|---|
| | Fe | Si | O | (Oe) | (G) | (%) |
| Ex. D-1 | 80 | 10 | 10 | 1200 | 4500 | 3 |
| Ex. D-2 | 60 | 30 | 10 | 1100 | 4000 | 2 |
| Ex. D-3 | 90 | 5 | 5 | 1110 | 5400 | 8 |
| Ex. D-4 | 70 | 25 | 5 | 1140 | 4200 | 4 |
| Ex. D-5 | 70 | 20 | 10 | 1150 | 4000 | 2 |
| Comp. Ex. D-1 | 90 | 10 | 0 | 540 | 5600 | 21 |
| Comp. Ex. D-2 | 90 | 0 | 10 | 1000 | 5200 | 12 |
| Comp. Ex. D-3 | 50 | 35 | 15 | 720 | 2800 | 12 |

Example E (Examples E-1 to E-5 and Comparative Examples E-1 to E-3)

A magnetic tape is obtained by repeating the same procedure as that of Example C except that gaseous $B_2H_6$ as a boron ion source is substituted for gaseous $PH_4$ as a phosphorus ion source. The feeding rate of the gaseous $B_2H_6$ is 3 cm$^3$/min and the feeding rate of the gaseous oxygen is 2 cm$^3$/min.

The evaluation results are shown in Table 5 below.

TABLE 5

| | Compn. (atomic %) | | | Coercive force | Saturation magnetic flux density | $\Delta$Bs |
|---|---|---|---|---|---|---|
| | Fe | B | O | (Oe) | (G) | (%) |
| Ex. E-1 | 80 | 10 | 10 | 1220 | 5100 | 5 |
| Ex. E-2 | 65 | 30 | 5 | 1100 | 4500 | 4 |
| Ex. E-3 | 90 | 5 | 5 | 1180 | 5900 | 7 |
| Ex. E-4 | 70 | 20 | 10 | 1100 | 4600 | 3 |
| Ex. E-5 | 85 | 5 | 10 | 1240 | 5200 | 4 |
| Comp. Ex. E-1 | 90 | 10 | 0 | 860 | 6000 | 18 |
| Comp. Ex. E-2 | 90 | 0 | 10 | 1000 | 5400 | 12 |
| Comp. Ex. E-3 | 50 | 35 | 15 | 720 | 2900 | 12 |

Example F (Examples F-1 to F-5)

A PET film having a thickness of 10 μm is fitted in an ion-assisted, oblique vacuum evaporation apparatus as illustrated in FIG. 2 and the PET film 10 is fed at a traveling speed of 2 m/min.

Then a Fe-Ni (atomic ratio =75:25) alloy 16 is put in a crucible 15 made of magnesium oxide. An electron gun 17 of, for example, 30 kW in output is actuated to evaporate the Fe and Ni, so that Fe-Ni is deposited on the PET film 10. Simultaneously, a mixed gas comprising gaseous nitrogen and gaseous oxygen is fed to an ion gun 19 of 400 W in output (gaseous nitrogen being fed at a rate of 3 cm$^3$/min while gaseous oxygen being fed at a rate of 2 cm$^3$/min) so that the PET film 10 is irradiated therewith.

By the ion-assisted, oblique vacuum evaporation method, a magnetic film of 1000 Å in thickness is formed to thereby obtain a magnetic tape.

The above procedure is repeated by varying the feeding rates of gaseous nitrogen and gaseous oxygen to obtain magnetic tapes each having a magnetic film of 1000 Å in thickness.

(Comparative Examples F-1 to F-4)

The same procedure as the above is repeated except that the gaseous nitrogen and gaseous oxygen are fed at varied rates, thereby producing magnetic tapes each having a thickness of 1000 Å.

(Comparative Example F-5)

A magnetic film composed of $Fe_xN$ is disposed on a nonmagnetic substrate, thereby producing a magnetic tape.

For each of the magnetic recording media obtained in the above Examples and Comparative Examples, the magnetic characteristics and corrosion resistance are evaluated in the same manner to those of Example A. The evaluation results are shown in Table 6 below.

TABLE 6

| | Compn. (atomic %) | | | | Coercive force | Saturation magnetic flux density | $\Delta$Bs |
|---|---|---|---|---|---|---|---|
| | Fe | Ni | N | O | (Oe) | (G) | (%) |
| Ex. F-1 | 55.8 | 18.6 | 18.6 | 7 | 1600 | 5400 | 5 |
| Ex. F-2 | 40 | 10 | 30 | 10 | 1250 | 4100 | 4 |
| Ex. F-3 | 75 | 10 | 10 | 5 | 1400 | 5900 | 9 |
| Ex. F-4 | 50 | 30 | 10 | 10 | 1450 | 4800 | 3 |
| Ex. F-5 | 55 | 10 | 30 | 5 | 1500 | 5600 | 3 |
| Comp. Ex. F-1 | 60 | 0 | 30 | 10 | 1550 | 5200 | 11 |
| Comp. Ex. F-2 | 60 | 30 | 0 | 10 | 1420 | 4900 | 13 |
| Comp. Ex. F-3 | 50 | 25 | 25 | 0 | 1380 | 4300 | 12 |
| Comp. Ex. F-4 | 35 | 35 | 15 | 15 | 110 | 1200 | 5 |
| Comp. Ex. F-5 | 75 | 0 | 25 | 0 | 840 | 550 | 15 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim is:

1. A magnetic recording medium comprising a magnetic film selected from the group consisting of:

(1) a Fe—N—O magnetic film comprising 70 to 90 atomic % of Fe, 5 to 15 atomic % of N and 5 to 15 atomic % of O, (2) a Fe—C—O magnetic film comprising 60 to 85 atomic % of Fe, 5 to 35 atomic % of C and 5 to 15 atomic % of O, (3) a Fe—P—O magnetic film comprising 70 to 90 atomic % of Fe, 5 to 25 atomic % of P and 5 to 10 atomic % of O, (4) a Fe—Si—O magnetic film comprising 60 to 90 atomic % of Fe, 5 to 30 atomic % of Si and 5 to 10 atomic % of O, (5) a Fe—B—O magnetic film comprising 65 to 90 atomic % of Fe, 5 to 30 atomic % of B and 5 to 10 atomic % of O, and (6) a Fe—Ni—N—O magnetic film comprising 40 to 75 atomic % of Fe, 10 to 30 atomic % of Ni, 10 to 30 atomic % of N and 5 to 10 atomic % of O, deposited on a substrate, which has a coercive force, Hc, of at least 1100 Oe, a saturation magnetic flux density, Bs, of at least 4000 G and a corrosion resistance, $\Delta$Bs, of 9% or less.

2. The magnetic recording medium as claimed in claim 1, wherein the magnetic film is formed with the use of Fe having a purity of at least 99.95%.

3. The magnetic recording medium as claimed in claim 1, wherein the magnetic film is (6) Fe—Ni—N—O magnetic film and the magnetic film is formed with the use of Fe having a purity of at least 99.95% or Ni having a purity of at least 99.95%, or Fe and Ni both having a purity of at least 99.95%.

4. The magnetic recording medium as claimed in claim 1, wherein the magnetic film is formed on a nonmagnetic substrate.

5. The magnetic recording medium as claimed in claim 1, which comprises a nonmagnetic substrate, an undercoat layer formed on a surface of the nonmagnetic substrate, the magnetic film formed on the undercoat layer and a back coat layer provided on the other surface of the nonmagnetic substrate.

6. The magnetic recording medium as claimed in claim 1, wherein the magnetic film is (1) a ferromagnetic thin film of the Fe—N—O magnetic film, and is formed on a nonmagnetic substrate.

7. A magnetic film selected from the group consisting of:

(1) a Fe—N—O magnetic film comprising 70 to 90 atomic % of Fe, 5 to 15 atomic % of N and 5 to 15 atomic % of O, (2) a Fe—C—O magnetic film comprising 60 to 85 atomic % of Fe, 5 to 35 atomic % of C and 5 to 15 atomic % of O, (3) a Fe—P—O magnetic film comprising 70 to 90 atomic % of Fe, 5 to 25 atomic % of P and 5 to 10 atomic % of O, (4) a Fe—Si—O magnetic film comprising 60 to 90 atomic % of Fe, 5 to 30 atomic % of Si and 5 to 10 atomic % of O, (5) a Fe—B—O magnetic film comprising 65 to 90 atomic % of Fe, 5 to 30 atomic % of B and 5 to 10 atomic % of O, and (6) a Fe—Ni—N—O magnetic film comprising 40 to 75 atomic % of Fe, 10 to 30 atomic % of Ni, 10 to 30 atomic % of N and 5 to 10 atomic % of O, deposited on a substrate and having a coercive force, Hc, of at least 1100 Oe, a saturation magnetic flux density, Bs, of at least 4000 G and a corrosion resistance, $\Delta$Bs, of 9% or less.

8. The magnetic recording medium according to claim 1, wherein said magnetic film is obtained by vacuum deposition.

9. The magnetic film according to claim 7, which is obtained by vacuum deposition.

* * * * *